United States Patent
Bae et al.

(10) Patent No.: US 9,984,320 B2
(45) Date of Patent: May 29, 2018

(54) MULTI-SMARTCARD

(71) Applicant: Brilliantts Co., Ltd., Seongnam-si (KR)

(72) Inventors: Jae Hun Bae, Seongnam-si (KR); Jae Ho Bae, Daejeon (KR); Byung Chul Jung, Seoul (KR)

(73) Assignee: Brilliantts Co., Ltd., Seongnam-si (KR)

( * ) Notice: Subject to any disclaimer, the term of this patent is extended or adjusted under 35 U.S.C. 154(b) by 0 days. days.

(21) Appl. No.: 15/326,367

(22) PCT Filed: Jul. 14, 2015

(86) PCT No.: PCT/KR2015/007276
§ 371 (c)(1),
(2) Date: Jan. 13, 2017

(87) PCT Pub. No.: WO2016/010327
PCT Pub. Date: Jan. 21, 2016

(65) Prior Publication Data
US 2017/0213119 A1    Jul. 27, 2017

(30) Foreign Application Priority Data

Jul. 14, 2014  (KR) .................. 10-2014-0088649
Jul. 13, 2015  (KR) .................. 10-2015-0099036

(51) Int. Cl.
*G06K 5/00* (2006.01)
*G06K 7/08* (2006.01)
(Continued)

(52) U.S. Cl.
CPC ............ *G06K 19/07* (2013.01); *G06F 3/0488* (2013.01); *G06F 3/0482* (2013.01); *G06Q 20/3574* (2013.01)

(58) Field of Classification Search
USPC ................................. 235/380, 375, 451, 492
See application file for complete search history.

(56) References Cited

U.S. PATENT DOCUMENTS 5,857,079 A    1/1999  Claus et al.
7,594,611 B1   9/2009  Arrington
(Continued)

FOREIGN PATENT DOCUMENTS

EP    0650142    10/2002
EP    2172952    4/2010
(Continued)

OTHER PUBLICATIONS

International Search Report dated Oct. 19, 2015 for International Application No. PCT/KR2015/007276.
(Continued)

*Primary Examiner* — Tuyen K Vo
(74) *Attorney, Agent, or Firm* — H.C. Park & Associates, PLC

(57) ABSTRACT

A multi-smartcard may include: a support; a touchscreen disposed on the support configured to receive an input operation from a user including a first input operation and a second input operation; and a processor configured to generate a first user interface (UI) of card information corresponding to the input operation applied to the touchscreen and instruct the touch screen to display the first UI, and to receive the first and second input operations, wherein the processor is configured to change the card category in response to receiving the first input operation and change the card type in response to receiving the second input operation.

5 Claims, 5 Drawing Sheets

(51) Int. Cl.
*G06K 19/06* (2006.01)
*G06K 19/07* (2006.01)
*G06F 3/0488* (2013.01)
*G06Q 20/34* (2012.01)
*G06F 3/0482* (2013.01)

(56) References Cited

U.S. PATENT DOCUMENTS

| | | | |
|---|---|---|---|
| 8,317,103 | B1 | 11/2012 | Foo et al. |
| 8,727,219 | B1 | 5/2014 | Mullen |
| 9,704,088 | B2 | 7/2017 | Mullen et al. |
| 2002/0175207 | A1 | 11/2002 | Kashef |
| 2004/0010462 | A1* | 1/2004 | Moon ................ G06Q 20/04 705/39 |
| 2006/0151614 | A1 | 7/2006 | Nishizawa et al. |
| 2008/0065535 | A1* | 3/2008 | Gangi ................ G06K 7/0004 705/41 |
| 2008/0121723 | A1 | 5/2008 | Asai et al. |
| 2008/0201265 | A1 | 8/2008 | Hewton |
| 2009/0261161 | A1* | 10/2009 | Blossom .......... G06K 19/06187 235/380 |
| 2009/0261166 | A1* | 10/2009 | Lawson ................ G06K 7/083 235/449 |
| 2010/0096465 | A1 | 4/2010 | Stagg |
| 2011/0016025 | A1* | 1/2011 | Gaisford ............ G06Q 10/087 705/27.1 |
| 2011/0028184 | A1 | 2/2011 | Cooper |
| 2011/0295748 | A1 | 12/2011 | Woodriffe |
| 2012/0024945 | A1 | 2/2012 | Jones |
| 2012/0085826 | A1 | 4/2012 | Talker |
| 2012/0168500 | A1 | 7/2012 | Li |
| 2013/0048712 | A1 | 2/2013 | Guillaud et al. |
| 2013/0134216 | A1 | 5/2013 | Spodak et al. |
| 2013/0248594 | A1* | 9/2013 | Soom ................ G06Q 20/3572 235/380 |
| 2014/0040128 | A1* | 2/2014 | Park ..................... G06Q 20/108 705/42 |
| 2014/0059496 | A1* | 2/2014 | White ................. G06F 3/0488 715/841 |
| 2014/0084059 | A1* | 3/2014 | Sierchio ............ G06K 19/0719 235/380 |
| 2014/0289671 | A1* | 9/2014 | Ohmori ................ G06F 3/0486 715/784 |

FOREIGN PATENT DOCUMENTS

| | | |
|---|---|---|
| JP | 10-502193 | 2/1998 |
| JP | 2007-233302 | 9/2007 |
| JP | 2014-119783 | 6/2014 |
| KR | 10-2010-0013668 | 2/2010 |
| KR | 10-2014-0065114 | 5/2014 |
| WO | 2005091212 | 9/2005 |
| WO | 2013/028930 | 2/2013 |

OTHER PUBLICATIONS

International Search Report dated Oct. 19, 2015 for International Application No. PCT/KR2015/007264.
International Search Report dated Sep. 25, 2015, in International Application No. PCT/KR2015/007273.
International Search Report dated Oct. 19, 2015, in International Application No. PCT/KR2015/007276.
The Extended European Search report dated Sep. 20, 2017 in European Application No. 15821326.4.
The Extended European Search report dated Jul. 19, 2017 in European Application No. 15861451.1.
Non Final Office Action dated Sep. 22, 2017, issued in U.S. Appl. No. 15/326,426.
Notice of allowance dated Sep. 5, 2017, issued in U.S. Appl. No. 15/326,416.
Corrected Notice of Allowability dated Sep. 13, 2017, issued in U.S. Appl. No. 15/326,416.
Notification of Reasons for Refusal dated Feb. 6, 2018, issued in Japanese Patent Application No. 2017-523747.

* cited by examiner

MULTI-SMARTCARD

CROSS-REFERENCE TO RELATED APPLICATIONS

This application is the National Stage Entry of International Application PCT/KR2015/007276, filed on Jul. 14, 2015, and claims priority from and the benefit of Korean Patent Application No. 10-2014-0088649, filed on Jul. 14, 2014 and Korean Patent Application No. 10-2015-0099036, filed on Jul. 13, 2015, which are incorporated herein by reference for all purposes as if fully set forth herein.

BACKGROUND

The invention relates generally to a multi-smartcard, and more particularly, to a multi-smartcard through which one of multiple cards to be used may be quickly selected by using a touchscreen provided at one side of the multi-smartcard.

DISCUSSION OF THE BACKGROUND

As modern society has rapidly become information-based and credit-based after industrialization, the use of credit cards, which are referred to as "plastic money," has increased to be as prevalent as cash. Accordingly, the number of credit cards carried by a regular adult has also significantly increased, and thus each person uses at least two or three cards, and in some cases, ten or more cards are held and used. Also, various rewards cards have been issued and are used as an essential marketing tool in most business to consumer (B2C)-based corporations, and are widely used to promote sales at small stores or shopping centers.

Accordingly, a large number of credit cards and reward cards are being issued and many are unnecessary and/or discarded, thereby generating unnecessary issuing costs and social costs. Furthermore, the reward cards or discount cards issued from individual stores may be utilized only when the consumer possesses such cards during their visits. This causes consumers to avoid use of these card due to inconvenient and complex card management and causes generation of unnecessary marketing costs to businesses.

For example, credit cards are generally considered to have better utilization than rewards cards. The average number of credit cards issued to each consumer increased to 4 in 2001, stopped increasing for a while after the credit card liquidity crisis, and then continued to increase to 4.9 in 2011. The total number of credit cards that has been issued reached approximately 122,130,000 in 2011.

However, the average number of cards that are actually used by each consumer is only 1.4 despite the increasing number of issued cards. As a result, most credit cards issued to each consumer become dormant, and about 20,000,000 or more cards (corresponding to about 40,000,000,000 Korean won or more) are being discarded. Considering that the above figure included various cash replacement cards including debit cards, check cards, cash cards, and prepaid cards or marketing cards such as rewards cards or discount cards, astronomical costs are being wasted on dormant or discarded cards.

Accordingly, there is a need to develop a card that integrates various cards such as debit cards, check cards, credit cards, and membership cards.

A user should select a desired card from among several cards stored in a multi-smartcard in order to perform payment. Since several cards may be included in a single card, selecting an appropriate card for payment or accumulation takes a long time from the user standpoint, and standby time for payment increases from a store standpoint.

A method of selecting a card to be used in cooperation with a smartphone exists. However, the method is inconvenient in that card selection cannot be performed when the smartphone is not carried by the user. Also, a method of inputting an identification number corresponding to a specific card with number buttons provided in a multi-smartcard in order to select the card exists. However, there also are inconveniences with this method, such as the user should remember an identification number of a card and the buttons should be pressed several times even when the user is in an urgent situation in which a card should be quickly used.

SUMMARY

Multi-smartcards constructed according to the principles of the invention can solve one or more of the above problems by providing a multi-smart that may acquire an input operation of the user through a touchscreen to conveniently and quickly select a card to be used.

According to a first aspect of the invention, a multi-smartcard may include: a support; a touchscreen disposed on the support configured to receive an input operation from a user including a first input operation and a second input operation; and a processor configured to generate a first user interface (UI) of card information corresponding to the input operation applied to the touchscreen and instruct the touch screen to display the first UI, and to receive the first and second input operations, wherein the processor is configured to change the card category in response to receiving the first input operation and change the card type in response to receiving the second input operation.

The first input operation and the second input operation may respectively include different combinations of at least one of input operations including a contact operation, a proximity operation, a sliding operation, and a tapping operation.

The first input operation may include a swiping operation in a first direction, and the second input operation may include a swiping operation in a second direction that is different from the first direction, the card information shown in the touchscreen may include a card image, and the processor may be configured to instruct the touchscreen to display different card images in the first UI in response to the first input operation or the second input operation.

The processor may be configured to instruct the touchscreen to display a card image with a specific rank in the changed category in the first UI according to the changed card category in response to the first input operation.

The first UI may include a card display area and an information display area, the card display area may be configured to display specific card identification information and receive the first input operation and the second input operation, and the information display area may be configured to display one or more pieces of card usage information associated with the card identification information shown in the card display area.

The processor may be configured to generate a second UI including a first portion and a second portion in response to receiving a checking input operation including a combination of the at least one of input operations, and instruct the touchscreen to display the second UI, wherein the first portion maintains display of the first UI, and wherein the second portion displays one or more selection items associated with the card information.

The touchscreen may be configured to receive an input operation from the user selecting a selection item from the second portion, and the one or more selection items may represent one or more card settings regarding the card information shown in the first portion.

The multi-smartcard may further include: a card data output unit configured to externally output specific card data in response to receiving a third input operation from the user, wherein the touchscreen may be configured to receive the third input operation requesting an output of the card information shown in the screen from the user.

The support may include a plate and the processor may include a control unit.

According to another aspect of the invention, a multi-smartcard may include: a support; an output unit configured to externally output specific card data; a touchscreen disposed on the support configured to receive a selection operation; and a processor configured to transmit card data corresponding to the selection operation to the output unit in response to the touchscreen receiving the selection operation, wherein the selection operation is an input operation applied to the touchscreen to select card data to be externally output through the output unit, and wherein the selection operation may include a combination of at least one of a contact operation, a tapping operation, and a sliding operation.

The processor may be configured to instruct the touchscreen to display card identification information or card usage information associated with the output card data in response to the touchscreen receiving the selection operation.

The processor may be configured to execute a setup mode in response to the touchscreen receiving a specific input operation to receive a custom set of cards and a custom selection operation linked to the custom set of cards through the touchscreen, the processor may be configured to instruct the touchscreen to display the custom set of cards in response to receiving the custom selection operation through the touchscreen.

The output unit may include at least one of contact-type and non-contact-type output units, and the processor may be configured to transmit card data to the output unit corresponding to the received selection operation.

The support may include a plate and the processor may include a control unit.

According to the invention, the following various effects can be obtained.

First, the user of the multi-smartcard may select a card to be used by conveniently operating a touchscreen without entering an identification number of a specific card or performing a specific button operation. That is, the user may conveniently select the card to be used through a first input operation for selecting a card category or a second input operation for selecting a card type, and also may conveniently select the card to be used by entering a selection operation pattern corresponding to specific card information. Thus, the user may quickly select a desired card and pay with the card in comparison to conventional methods.

Second, the user may select a specific card while viewing card usage information of the card to quickly select the card while viewing desired information because a card display area and an information display area are included in the multi-smartcard. Also, since the user selects the card while checking the card usage information such as card benefit information, the user may make reasonable purchasing decision.

Third, the unlocking unit may prevent an unintended touch operation from being input. Also, the unlocking unit may be provided at a position that is generally touched when the user selects a card. Thus, a card selection situation may be recognized even though no special unlocking operation is performed and a touch operation function may be activated. Thus, the user may further conveniently use a card.

Fourth, a UI may allow the user to easily check a list of cards and then perform selection is displayed on the display unit, the user may quickly and conveniently select a desired card.

The foregoing general description and the following detailed description are exemplary and explanatory and are intended to provide further explanation of the claimed subject matter.

DETAIL DESCRIPTION OF THE ILLUSTRATED EMBODIMENTS

Figure 1:
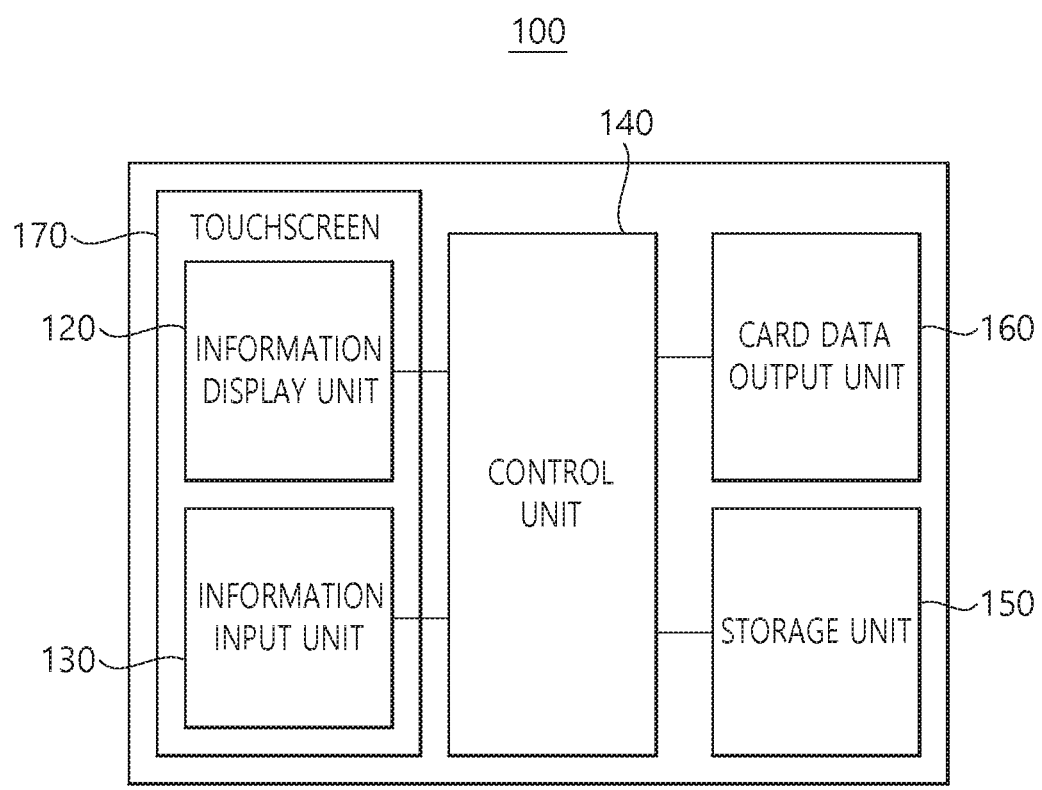
FIG. 1 is a block diagram of a multi-smartcard including a touchscreen according to an exemplary embodiment of the invention.

Preferred embodiments of the invention will be described below in detail with reference to the accompanying drawings. Advantages and features of the invention and methods of accomplishing the same will be apparent by referring to embodiments described below in detail in connection with the accompanying drawings. However, the invention is not limited to the embodiments disclosed below and may be implemented in various different forms. The exemplary embodiments are provided only for completing the disclosure of the invention and for fully representing the scope of the invention to those skilled in the art. The scope of the invention is defined only by the claims. Like reference numerals refer to like elements throughout.

Unless otherwise defined, all terms (including technical and scientific terms) used herein have the same meaning as commonly understood by one of ordinary skill in the art to which this invention belongs. It should be further understood that terms, such as those defined in commonly-used dictionaries, should be interpreted as having a meaning that is consistent with their meaning in the context of the relevant art and are not to be interpreted in an idealized or overly formal sense unless expressly so defined herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. The terms "comprises" and/or "comprising" used herein specify the presence of stated elements, but do not preclude the presence or addition of one or more other elements.

The term "card information" used herein indicates a variety of information associated with a card. Card information may include card identification information, card usage information, etc. Card identification information indicates information for identifying a card when the user uses or selects the card. For example, card identification information may include a card number, a card image, a card name, etc. Card usage information refers to information on the use of a card by the user. For example, card usage information may include information needed by the user to use a card, such as card benefit information, card usage setting information (e.g., a use limit of a card, the maximum number of times a card can be used, etc.), card usage history information, etc.

The term "card data" used herein refers to data that is output to the outside in order to perform payment, accumulation, etc. through a specific card. For example, card data may be output through a card data output unit to be described below and delivered to a card reader. When the card data output unit to be described below is a magnetic field generating unit, card data may correspond to a card number.

Figure 2:
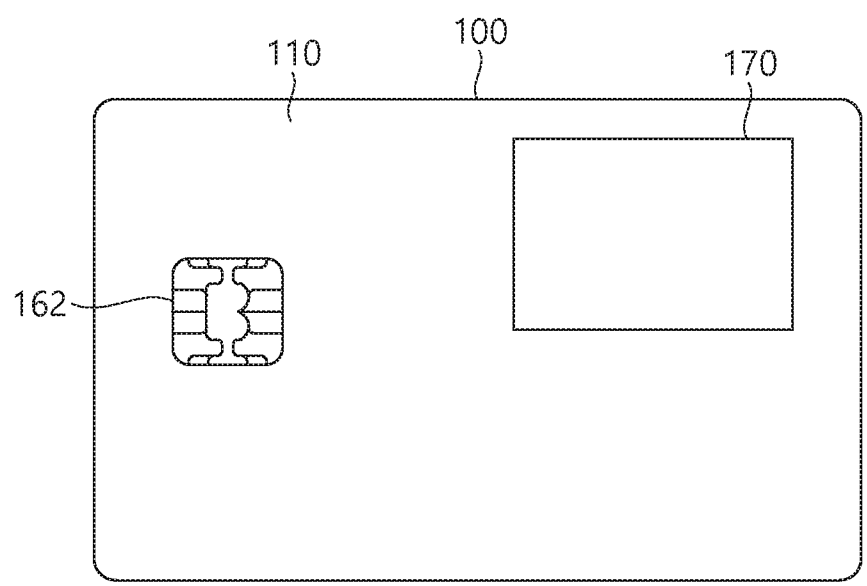
FIG. 2 is a plan view diagram of a multi-smartcard in horizontal orientation according to an exemplary embodiment of the invention.
Figure 3:
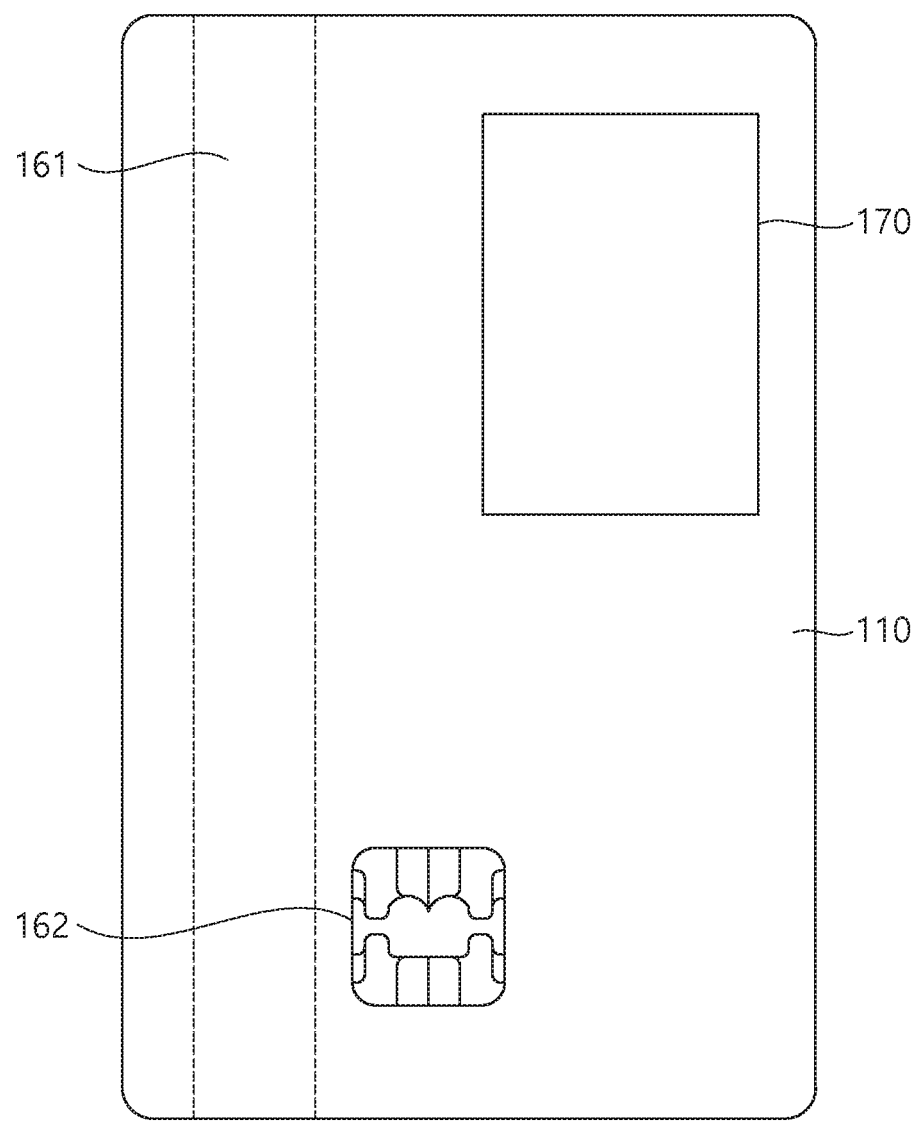
FIG. 3 is a plan view diagram of a multi-smartcard in vertical orientation according to an exemplary embodiment of the invention.
Figure 4:
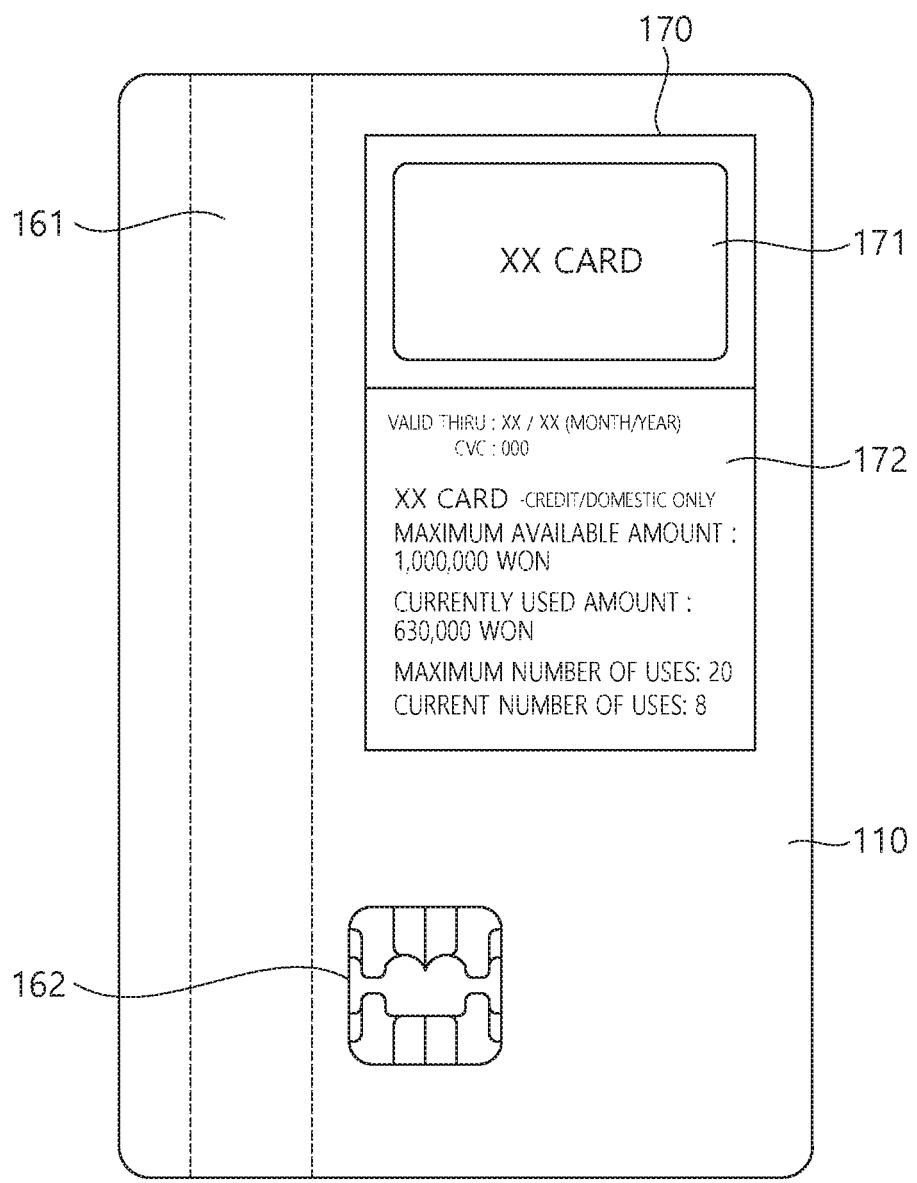
FIG. 4 is a plan view diagram of a multi-smartcard including touchscreen having a card display area and an information display area according to an exemplary embodiment of the invention.
Figure 5:
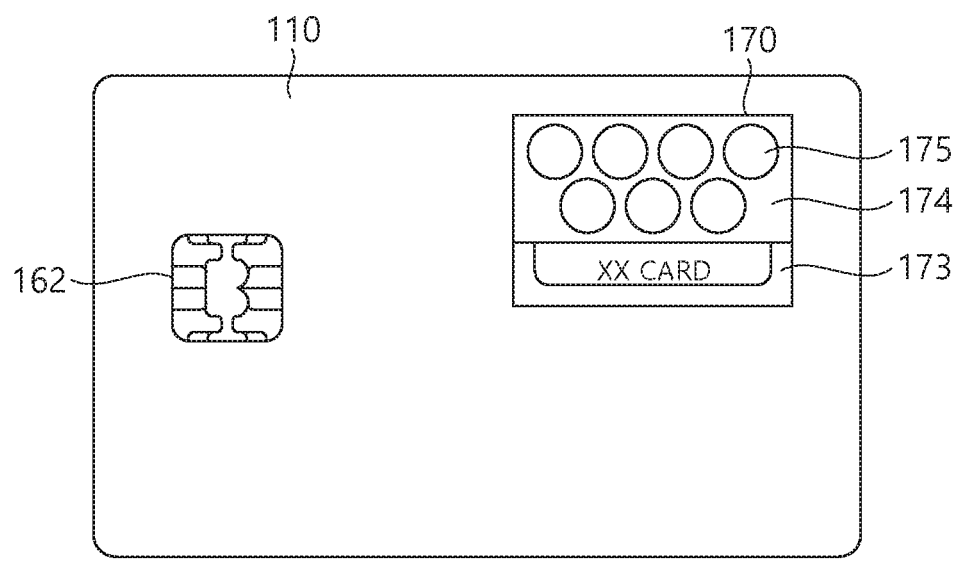
FIG. 5 is a plan view diagram of a multi-smartcard having a touch screen partitioned into a first portion and a second portion that shows a selected item in response to a specific input operation, according to an exemplary embodiment of the invention.

FIG. 1 is a block diagram of a multi-smartcard including a touchscreen according to an exemplary embodiment of the invention. FIG. 2 is a plan view diagram of a multi-smartcard in horizontal orientation according to an exemplary embodiment of the invention. FIG. 3 is a plan view diagram of a multi-smartcard in vertical orientation according to an exemplary embodiment of the invention. FIG. 4 is a plan view diagram of a multi-smartcard having a touchscreen including a card display area and an information display area according to an exemplary embodiment of the invention. FIG. 5 is a plan view diagram of a multi-smartcard having a touch screen partitioned into a first portion and a second portion that shows a selected item in response to a specific input operation according to an exemplary embodiment of the invention.

Referring to FIGS. 1, 2, 3, 4, and 5, a multi-smartcard 100 includes a support such as a plate 110, an information display unit 120, an information input unit 130, a control unit 140, a storage unit 150, a card data output unit 160 including a magnetic field generating unit 161 and an integrated circuit (IC) chip 162, a touchscreen 170, a card display area 171, an information display area 172, a first portion 173, a second portion 174, and a selection item 175.

Hereinafter, multi-smartcards according to embodiments of the invention will be described with reference to the accompanying drawings.

Referring to FIG. 1, the multi-smartcard 100 according to an exemplary embodiment of the invention may include all or some of the following: the plate 110, the information input unit 130, the information display unit 120, the control unit 140, the storage unit 150, the card data output unit 160, an unlocking unit, and an insertion detecting unit.

The plate 110 may be formed as a rectangular board, and edge portions of the rectangular board may have round corners. The plate 110 may include components, such as the card data output unit 160 and the control unit 140 of the multi-smartcard 100. The plate 110 may be formed as a metal plate or a plastic plate made of a flexible material like a general card and also may be formed by stacking several layers. Also, the plate 110 may be formed by molding a substrate on which elements of the multi-smartcard 100 are disposed.

The card data output unit 160 may be disposed on the plate 110. For example, when the card data output unit 160 is the magnetic field generating unit 161 for generating a magnetic signal, the card data output unit 160 may be disposed at one side of a rear surface thereof, more particularly, at one side of a rear surface adjacent to any one of two long sides of the plate 110 formed as a rectangle, and may be exposed to the outside. Also, for example, when the card data output unit 160 is the IC chip 162, the card data output unit 160 may be disposed at one side of a front surface thereof, and may be exposed to the outside. Also, for example, when the card data output unit 160 is a short-range wireless communication unit, the card data output unit 160 may be built into the plate 110 and configured to transmit a wireless communication signal to communicate the card information to the outside.

The plate 110 may also include the insertion detecting unit in a direction extending from one end of the magnetic field generating unit 161 (e.g., a direction in which the plate 110 is inserted into a card reader) and may be exposed to the outside. Also, the information display unit 120 and the information input unit 130 may be provided at one side of the front surface of the plate 110, and may be exposed to the outside.

The plate 110 may include elements that are exposed to the outside, such as the card data output unit 160, the insertion detecting unit, the information display unit 120, and the information input unit 130, and elements that are not exposed to the outside, such as the control unit 140, electrical wirings, a memory, and a power supply unit. When a plurality of plates 110 are formed, the electrical wirings may be formed between the plurality of plates 110, and the plurality of plates 110 may be connected through via holes corresponding to wiring paths.

The information input unit 130 generates input data used by the user to control operation of a terminal. The information input unit 130 may include a keypad, a dome switch, a touch pad (e.g., a resistive/capacitive type), a jog wheel, or a jog switch. In particular, a touch pad may refer to the touchscreen 170 when the touch pad is formed in a layered structure together with the information display unit 120.

The information display unit 120 may be disposed at one side of the plate 110 and configured to display relevant information on a screen to provide the information to the user. The information display unit 120 may display video or image data generated by the control unit 140.

The information display unit 120 may include at least one of a liquid crystal display, a thin film transistor-liquid crystal display, an organic light-emitting diode, a flexible display, and an electronic paper. Also, according to exemplary embodiments, the multi-smartcard may include two or more information display units 120. For example, the information display units 120 may be provided on both of the front surface and the rear surface of the multi-smartcard.

Electronic paper is an electronic device that may replicate the appearance of paper and serve as paper, and may also be referred to as e-paper. Various methods of electronic paper may include achieving an ink effect using small balls or capsules and achieving a paper effect by making a flat panel display such as a conventional liquid crystal display (LCD) thinner.

The information display unit 120 may be disposed at one side of the front surface of the plate 110. In particular, the information display unit 120 may be disposed in an area that does not overlap the IC chip 162 disposed at one side of the front surface of the plate 110 and the magnetic field generating unit 161 disposed at one side of the rear surface of the plate 110. Thus, when the magnetic field generating unit 161 is swiped in a magnetic card reader or when the multi-smartcard is inserted into an IC card reader, the information display unit 120 may be prevented from being damaged. Also, the information display unit 120 may be disposed on a position of the plate 110 adjacent to a touch unit so that the user may perform a touch operation while viewing the information display unit 120.

When the information display unit 120 and a touch sensor form a layered structure (hereinafter referred to as the touchscreen 170), the information display unit 120 may be used as an input device as well as an output device. The touchscreen 170 may display a first user interface (UI) to receive an input operation at a position corresponding to the screen from the user. The touchscreen 170 may receive various input operations such as a contact operation, a sliding operation, a swiping operation, and a tapping operation from the user.

The card data output unit 160 is configured to transmit information of the card to be used for payment or accumulation. The card data output unit 160 may include various elements that may transmit card information to an external card reader. For example, the card data output unit 160 may include the magnetic field generating unit 161, the IC chip 162, the short-range wireless communication unit, etc.

The magnetic field generating unit 161 includes a magnetic cell that forms a magnetic field through a flow of an electric current and outputs a magnetic signal of the card information. The magnetic field generating unit 161 may include at least one track. Each of the tracks may include a magnetic cell and generate a magnetic signal to be provided to a header of a card reader. The magnetic cell may be configured in various forms. For example, one or more magnetic cells may be disposed on the track. Also, the magnetic cell may be disposed in various directions. For example, the magnetic cell may be disposed in an upright direction so that only a specific pole is exposed at one side surface of the plate 110 when the magnetic field is generated. That is, the magnetic cell may be disposed at one side surface of the plate 110 so that only a specific pole is exposed in an output direction of the magnetic signal according to a direction of the electric current. Also, for example, the magnetic cell may be disposed so that both poles of the magnetic cell are exposed in the output direction of the magnetic signal.

The IC chip 162 may exchange data with a contact-type card reader. That is, the IC chip 162 may have a portion that may come into physical contact with a card reader and be exposed to the outside of the plate 110. Accordingly, when the multi-smartcard 100 is inserted into a contact-type card reader, the IC chip 162 may directly exchange data therewith by coming into contact with a card contacting part of the contact-type card reader.

The short-range wireless communication unit may be included in the plate 110 and configured to transmit card information to the outside through short-range wireless communication. Also, the short-range wireless communication unit may be configured to receive new card information or receive user authentication information from an external device. The short-range wireless communication unit may use short-range communication technology including, but not limited to, Bluetooth, Bluetooth low energy (BLE), beacon, radio frequency identification (RFID), infrared data association (IrDA), ultra wideband (UWB), ZigBee, near field communication (NFC), etc. The short-range wireless communication unit may receive new card information and deliver the received card information to the control unit 140.

The control unit 140 may process the information and store the processed information in the memory.

The control unit 140 performs all control functions of the multi-smartcard and may be or include a processor. The control unit 140 is configured to transmit the card information to the specific card data output unit 160. For example, the control unit 140 may be included in the plate 110 and configured to deliver card data corresponding to the card information selected through an operation of the touchscreen 170 received from the user to the magnetic field generating unit 161 and instruct the magnetic field generating unit 161 to generate a specific magnetic driving current signal corresponding to the received card information. The control unit 140 may control the magnetic field generating unit 161 to generate magnetic signals in time sequence by controlling supply of the magnetic driving current signal and/or a direction of the magnetic driving current signal. That is, the magnetic cell may control a direction of a magnetic field applied to a header of a card reader by adjusting an electric current. Also, when a plurality of magnetic cells are included in a specific track, the control unit 140 may collectively control the direction of an electric current so that the same pole is generated for each magnetic cell in the output direction of the magnetic signal (i.e., a direction of a header of a card reader). When the magnetic field generating unit 161 includes a plurality of tracks, the control unit 140 may control a magnetic driving current signal input to each of the tracks, and may cause a change in a magnetic field in a header of a card reader corresponding to each of the tracks.

The control unit 140 may generate information or a screen to be displayed on the information display unit 120. That is, the control unit 140 may generate a card UI and provide the card UI to the information display unit 120. When the user selects or sets a desired configuration of the UI, the control unit 140 may generate a UI corresponding to settings of the user and provide the generated UI to the information display unit 120.

The control unit 140 may be configured to receive an input operation from the information input unit 130, determine a corresponding operation, and issue a command to perform the operation. For example, the touchscreen 170 may include the information input unit 130 and the information display unit 120, and the control unit 140 may analyze a position, a kind, or a type of the input operation received from the touchscreen 170, and may determine a control command corresponding to the received input operation. When an input operation is received through the touchscreen 170, the control unit 140 may deliver card data of card information corresponding to the input operation to the card data output unit 160, generate a screen for showing the card information corresponding to the input operation, and deliver the generated screen to the touchscreen 170.

The storage unit 150 stores a plurality of card information and card data. Also, when a plurality of pieces of card information are stored, the storage unit 150 may categorize the cards so that the user may quickly and easily select a card. For example, the multi-smartcard 100 may categorize and store cards into types of the cards, such as a credit card category, a check card category, a rewards card category, and a membership card category, and/or categorize and store the cards into a card usage frequency or a card issuer. Also, the storage unit 150 may store a program for operating the control unit 140.

The insertion detecting unit may include a pressure sensor and may recognize an insertion of the multi-smartcard into a card reader. The insertion detecting unit may be disposed at a specific position of the plate 110 which a header of a card reader passes. For example, the pressure sensor may be disposed above or below the magnetic field generating unit 161. When a multi-smartcard is inserted into a card reader, pressure may be applied to the pressure sensor by a header of the card reader. That is, when the header is in contact with one surface of the card reader and the multi-smartcard inserted between the header and the surface of the card reader, the multi-smartcard may recognize the insertion of the multi-smartcard into the card reader and supply power to the magnetic cell.

Also, for example, when the multi-smartcard is dynamically swiped, the insertion detecting unit may be provided at a position adjacent to an end of the magnetic field generating unit 161. When the multi-smartcard moves inside a card reader, the insertion detecting unit may detect contact of a header of the card reader before the magnetic field generating unit 161 is recognized by the header. Accordingly, it is possible to reduce power consumption since the multi-smartcard starts to generate a magnetic signal when the multi-smartcard starts to be read.

Also, the insertion detecting unit may receive an electric signal generated by exchange of a magnetic signal for card information between a header of a card reader and the magnetic field generating unit 161, and may detect an insertion of the multi-smartcard into the card reader. That is, the magnetic cell of the magnetic field generating unit 161 may function as an inductive sensor, and detect a change in a magnetic field between the magnetic cell and the header of the card reader and transmit the card information to the header of the card reader.

Also, the insertion detecting unit may include both the pressure sensor and the inductive sensor. Thus, it is possible to prevent a malfunction caused by pressure being applied to the pressure sensor through an element other than a header of a card reader, and it is also possible to prevent a malfunction caused by a change in magnetic field of the magnetic cell by an object that causes a change the magnetic field other than a header of a card reader being detected.

The unlocking unit is provided at one surface of the plate 110 and configured to receive an unlocking operation for activating a touch operation function of the touch unit. That is, when the user wants to operate the multi-smartcard, the user may operate the unlocking unit before or at the same time as the operation of the touch unit to activate the touch operation function. For example, the touch unit may activate the touch operation function only when the unlocking operation is applied to the unlocking unit by the user. Thus, it is possible to prevent an unintended touch operation from being input through the touch unit.

The unlocking unit may be provided as a button or a touch sensor (e.g., a physical touch sensor). That is, when the user wants to input a touch operation and presses the button with his or her finger or touches the touch sensor with his or her finger, the unlocking unit may activate the touch operation function.

Also, the unlocking unit may include a fingerprint recognition module for receiving fingerprint information of the user, and may activate the touch operation function when the received fingerprint information matches prestored fingerprint information. That is, the fingerprint recognition module may receive fingerprint information when the user's finger comes into contact with the fingerprint recognition module, determine whether the received fingerprint information matches user fingerprint information stored in the multi-smartcard, and determine whether to activate the touch operation function or all functions of the multi-smartcard.

Thus, it is possible to prevent a third party other than an owner of a card from arbitrarily operating the card or paying with the card.

A process of selecting a card by using the multi-smartcard 100 will be described in detail below.

Referring to FIGS. 2 and 3, the multi-smartcard 100 according to an exemplary embodiment of the invention may include the plate 110, the touchscreen 170, and the control unit 140. The touchscreen 170 may be provided at one side of the plate 110 and configured to output card information and receive an input operation from the user. When an input operation is applied to the touchscreen 170, the touchscreen 170 may receive and display a screen that is generated by the control unit 140 to show card information corresponding to the input operation. The input operation may include various operations, such as a contact operation, a proximity operation, a swiping operation, and a tapping operation, that may be recognized by the touchscreen 170.

The input operation may include a first input operation and a second input operation. The first input operation may correspond to an input operation of changing a card category, and the second input operation may correspond to an input operation of changing a card type. The first input operation and the second input operation may be configured as different combinations of one or more input operations. That is, in order to distinguish the first input operation and the second input operation, the multi-smartcard 100 may designate different combinations of input operations as the first input operation and the second input operation.

According to an exemplary embodiment, the first input operation and the second input operation may be sliding operations (or swiping operations) that are input in different directions, and the card information shown on the touchscreen 170 may include a card image. In detail, the multi-smartcard 100 may display the card information (e.g., the card image) on the touchscreen 170. The touchscreen 170 of the multi-smartcard 100 may display different card images in response to receiving the first input operation or the second input operation.

When the user inputs the first input operation to the touchscreen 170, the user may change the category. For example, when an input operation of swiping up and down is set as the first input operation, the card category may be changed by an operation of swiping up or down. Also, the user may change the card type by inputting the second input operation in a specific card category selected through the first input operation input. For example, when an input operation of swiping left and right is set as the second input operation, the card type may be changed by the operation of swiping left or right.

Also, according to an exemplary embodiment, when the card category is changed according to the first input operation, a card image with a specific rank in the changed category may be shown. In a case in which card information (e.g., a card image) of a specific card selected by the touchscreen 170 is shown, specific card information may be displayed as a default value when the category is changed according to the first input operation. For example, a card in a specific category may be set and determined as the default value. The multi-smartcard 100 may receive a selection of a frequently-used card from the user and set the card as the default value, and may track a card selection frequency and periodically set the default value in a specific category. Also, the multi-smartcard 100 may display a card in a changed category which has a rank corresponding to a rank of a card in the previous category.

According to an exemplary embodiment of the invention, as shown in FIG. 4, the touchscreen may include the card display area 171 and the information display area 172. The card display area 171 may show specific card identification information and receive the first input operation and the second input operation, and the information display area 172 may show one or more pieces of card usage information associated with the card identification information shown in the card display area 171. When a card to be used is selected from among a plurality of cards stored in the multi-smartcard, the user may want to check card usage information associated with the specific card as well as card identification information (e.g., a card name, a card image, etc.). For example, the user may want to select a card to be used while directly checking the number of times that the specific card should be used by the user, a minimum amount that should be used by the user, benefits of each card, etc. Accordingly, the touchscreen 170 may include the card display area 171 that shows the card identification information and the information display area 172 that shows the card usage information. That is, the first UI generated by the multi-smartcard 100 (that is, the control unit 140) may include two areas (that is, the card display area 171 and the information display area 172) and display the first UI on the touchscreen 170.

The card display area 171 of the touchscreen 170 may show the card identification information and receive an input operation for changing or selecting a card from the user. That is, the card display area 171 may receive the first input operation and change the card category, and may receive the second input operation and change the card type.

The information display area 172 of the touchscreen 170 may show a variety of card usage information. The multi-smartcard 100 may receive settings of card usage information to be shown from the user and may show the card usage information. Also, the information display area 172 may receive a specific input operation from the user, and may change the type of card usage information to be shown. For example, the information display area 172 may show any one of a plurality of pieces of card usage information (e.g., card benefits or affiliate information), and may receive a specific input operation (e.g., an operation of sliding left and right) from the user and show other card usage information (e.g., the number of times that a card was used this month or an amount used this month).

Also, according to an exemplary embodiment, when the touchscreen 170 receives a specific input operation (a checking input operation), the screen may be separated into the first portion 173 and the second portion 174. For example, the control unit may generate a second UI comprising the first portion 173 and the second portion 174 in response to receiving the checking input operation, the instruct the touchscreen 170 to display the second UI. The second UI displayed on the touchscreen 170 may include the first portion 173 which maintains the first UI, and the second portion 174 which displays one or more selection items 175 associated with the card information. Various combinations of input operations may be applied as the input operation for separating the screen of the touchscreen 170 into the first portion 173 and the second portion 174.

One or more selection items 175 may be shown in the second portion 174. The one or more selection items 175 may represent one or more card settings regarding the card information shown in the first portion 173. For example, each of the setting objects may correspond to setting up a maximum number of uses, a maximum available amount, or the like of a specific card. As shown in FIG. 5, the setting objects may be displayed with one or more selectable figure images.

Also, the touchscreen 170 may receive an input operation for selecting a specific selection item 175 in the second portion 174. According to an exemplary embodiment, the checking input operation may be a tap and hold, and when the user tap and holds the touchscreen 170, the screen of the touchscreen 170 may be divided into the first portion 173 and the second portion 174, and images of the one or more selectable selection items 175 are shown in the second portion 174, according to the second UI. When an operation of touching an image of the specific selection item 175 is received from the user, the specific selection item 175 may be selected.

Also, the touchscreen 170 may receive a third input operation, which is a specific input operation that is set to request that the card data corresponding to the card information shown in the screen be externally output. Any one of various combinations of input operations that are recognizable by the touchscreen 170 may be applied as the third input operation. When the touchscreen 170 receives the third input operation, the control unit 140 may request the specific card data output unit 160 to output card data corresponding to requested card information.

Also, the third input operation may include one or more input operations, each of which may be connected to respective card data output units 160 included in the multi-smartcard 100. Since the multi-smartcard 100 includes one or more card data output units 160, the user may input a third input operation corresponding to a specific card data output unit 160 to output card data of a selected card to the card data output unit 160.

Referring to FIG. 2 or 3, a multi-smartcard 100 according to the exemplary embodiments of the invention may include a plate 110, a card data output unit 160, a touchscreen 170, and a control unit 140. The touchscreen 170 may be provided at one side of the plate 110 and configured to receive a selection operation from the user. The selection operation may be an input operation that is applied to the touchscreen 170 to select card data to be output through the card data output unit 160. That is, specific card data may match a specific selection operation. When the specific selection operation is input to the touchscreen 170, the control unit 140 may determine the card data corresponding to the selection operation and transmit the card data to the card data output unit 160.

The selection operation may be a combination of at least one or more of input operations including a contact operation, a tapping operation, and a sliding operation. The input operation may vary depending on a position of the contact operation or the tapping operation on the touchscreen 170 and a start position or a direction of the sliding operation on the touchscreen 170. When the touchscreen 170 receives a specific input operation, the control unit 140 may recognize the type of the input operation (e.g., which of a tapping operation, a contact operation, and a sliding operation corresponds to the input operation), a position of the input operation, or a direction of the input operation. Thus, the multi-smartcard 100 may receive a selection operation, which is a combination of one or more input operations, find card information corresponding to the selection operation, and externally output card data through the card data output unit 160.

Also, when the selection operation is applied to the touchscreen 170, the control unit 140 may display a specific screen corresponding to the selection operation. The screen may show card identification information or card usage information associated with the output card data.

Also, according to an exemplary embodiment, the control unit 140 may execute a custom selection setup mode according to a specific input operation. That is, the multi-smartcard 100 may include the custom selection setup mode in which a custom selection operation received from the user is linked to card information. For example, the user may execute the custom selection setup mode by inputting a specific input operation (or a custom selection operation) to the touchscreen 170. When the custom selection setup mode is executed, the touchscreen 170 may receive a selection of a custom set of cards (e.g., a selection of a card through a vertical operation for changing a card category and a horizontal operation for changing a card type in a case in which a specific card image is shown on the screen) from the user, and may receive a specific input operation (or a custom selection operation) (e.g., a specific input operation pattern in which a contact operation, a tapping operation, and a sliding operation are combined) linked to the custom set of cards.

Also, the card data output unit 160 may include one or more contact-type or non-contact-type output units, and the control unit 140 may be configured to input card data to a specific output unit corresponding to the received selection operation. That is, the multi-smartcard 100 may perform matching on various card data output units 160 depending on the selection operation. For example, while performing matching between card information and a selection operation in the custom selection setup mode, the multi-smartcard 100 may also receive a selection of a specific card data output unit 160 from the user. Also, for example, a unique selection operation may be determined for each card data output unit 160. A card data output unit 160 to be used may be selected by receiving a selection operation for selecting specific card information and then a selection operation for selecting the card data output unit 160 from the user.

According to the invention, the following various effects can be obtained.

First, the user of the multi-smartcard may select a card to be used by conveniently operating a touchscreen without entering an identification number of a specific card or performing a specific button operation. That is, the user may conveniently select the card to be used through a first input operation for selecting a card category or a second input operation for selecting a card type, and also may conveniently select the card to be used by entering a selection operation pattern corresponding to specific card information. Thus, the user may quickly select a desired card and pay with the card in comparison to conventional methods.

Second, the user may select a specific card while viewing card usage information of the card to quickly select the card while viewing desired information because a card display area and an information display area are included in the multi-smartcard. Also, since the user selects the card while checking the card usage information such as card benefit information, the user may make reasonable purchasing decision.

Third, the unlocking unit may prevent an unintended touch operation from being input. Also, the unlocking unit may be provided at a position that is generally touched when the user selects a card. Thus, a card selection situation may be recognized even though no special unlocking operation is performed and a touch operation function may be activated. Thus, the user may further conveniently use a card.

Fourth, a UI may allow the user to easily check a list of cards and then perform selection is displayed on the display unit, the user may quickly and conveniently select a desired card.

Embodiments of the invention have been described above with reference to the accompanying drawings. Those skilled in the art should understand that various changes in form and details may be made therein without departing from the spirit and scope of the invention as defined by the appended claims. The above embodiments are accordingly to be regarded as illustrative rather than restrictive.

What is claimed is:

1. A multi-smartcard, comprising:
   a support;
   a touchscreen disposed on the support configured to receive an input operation from a user including a first input operation and a second input operation;
   a card data output unit configured to externally output specific card data of a card of a plurality of cards in response to receiving a third input operation from the user; and
   a processor configured to generate a first user interface (UI) of card information comprising a card image of the card corresponding to the input operation applied to the touchscreen and instruct the touchscreen to display the first UI, and to receive the first and second input operations,
   wherein the processor is configured to change a card category in response to receiving the first input operation and change a card type in response to receiving the second input operation,
   wherein the first input operation comprises a swiping operation in a first direction, and the second input operation comprises a swiping operation in a second direction that is different from the first direction,
   wherein the processor is configured to instruct the touchscreen to display a first card image of a first card among the plurality of cards, the first card having a specific rank in the card category changed in response to the first input operation,
   wherein the processor is configured to instruct the touchscreen to display a second card image of a second card among the plurality of cards, the second card having a specific rank in the card type changed in response to the second input operation,
   wherein the processor is configured to track card selection frequency of the plurality of cards and periodically change the second card image initially displayed in the touchscreen based on the tracking of the card selection frequency in the card category,
   wherein the card data output unit comprises a contact-type output unit and a non-contact-type output unit,
   wherein the touchscreen is configured to receive the third input operation from the user requesting an output of the card information of the card corresponding to the card image shown in the screen, and
   wherein the processor is configured to match between the card information and the card data output unit to input card data to the contact-type output unit or the non-contact-type output unit corresponding to the received selection operation.

2. The multi-smartcard of claim 1,
   wherein the first input operation and the second input operation respectively comprise different combinations of at least one of input operations comprising a contact operation, a proximity operation, a sliding operation, and a tapping operation.

3. The multi-smartcard of claim 1,
wherein the first UI comprises a card display area and an information display area,
wherein the card display area is configured to display specific card identification information and receive the first input operation and the second input operation, and
wherein the information display area is configured to display one or more pieces of card usage information associated with the card identification information shown in the card display area.

4. The multi-smartcard of claim 1,
wherein the processor is configured to generate a second UI comprising a first portion and a second portion in response to receiving a checking input operation comprising a combination of the at least one of input operations, and instruct the touchscreen to display the second UI,
wherein the first portion maintains display of the first UI, and
wherein the second portion displays one or more selection items associated with the card information.

5. The multi-smartcard of claim 4,
wherein the touchscreen is configured to receive an input operation from the user selecting a selection item from the second portion, and
wherein the one or more selection items represents one or more card settings regarding the card information shown in the first portion.

* * * * *